United States Patent
Kim et al.

(10) Patent No.: US 7,095,576 B2
(45) Date of Patent: Aug. 22, 2006

(54) METHOD AND APPARATUS FOR CONTROLLING A WRITE CURRENT IN A HARD DISK DRIVE

(75) Inventors: Jong-yoon Kim, Yongin-si (KR); Jae-deog Cho, Suwon-si (KR); Seong-hwan Yu, Suwon-si (KR); Jin-wan Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/943,161

(22) Filed: Sep. 17, 2004

(65) Prior Publication Data

US 2005/0146803 A1 Jul. 7, 2005

(30) Foreign Application Priority Data

Dec. 24, 2003 (KR) .................. 10-2003-0096289

(51) Int. Cl.
*G11B 5/09* (2006.01)
(52) U.S. Cl. .............................. 360/46; 360/68; 360/31
(58) Field of Classification Search .................... None
See application file for complete search history.

(56) References Cited

U.S. PATENT DOCUMENTS

| | | | | |
|---|---|---|---|---|
| 5,600,500 A * | 2/1997 | Madsen et al. | ............... | 360/46 |
| 6,717,759 B1 * | 4/2004 | Himle et al. | .................. | 360/31 |
| 6,914,738 B1 * | 7/2005 | Fujiwara et al. | ............... | 360/68 |
| 2003/0072100 A1 * | 4/2003 | Lee et al. | ...................... | 360/53 |
| 2003/0112541 A1 * | 6/2003 | Lee et al. | ...................... | 360/55 |
| 2004/0075931 A1 * | 4/2004 | Kim et al. | ..................... | 360/66 |
| 2004/0125478 A1 * | 7/2004 | Kim et al. | ..................... | 360/31 |
| 2004/0174627 A1 * | 9/2004 | Kim et al. | ..................... | 360/31 |
| 2005/0094300 A1 * | 5/2005 | Yano et al. | .................. | 360/31 |

FOREIGN PATENT DOCUMENTS

| | | |
|---|---|---|
| JP | 2001-14609 | 1/2001 |
| JP | 2001-273603 | 10/2001 |
| JP | 2001-351204 | 12/2001 |
| JP | 2002-92821 | 3/2002 |
| JP | 2002-133610 | 5/2002 |

OTHER PUBLICATIONS

Korean Office Action for Appln. No. 10-2003-0096289 dated Jul. 22, 2005.

* cited by examiner

*Primary Examiner*—Andrea Wellington
*Assistant Examiner*—Dan I Davidson
(74) *Attorney, Agent, or Firm*—Staas & Halsey LLP (57) ABSTRACT

A method and apparatus for controlling a write current capable of improving an adjacent track erasure (ATE) property of a hard disk drive. The method for controlling the write current in a hard disk drive includes applying overshoot current and write current to a head to write data on a disk, waiting for a predetermined time to pass, with the predetermined time being determined according to a thermal pole tip protrusion (TPTP) property of the head, and reducing the overshoot current and the write current upon passing of the predetermined time. Accordingly, since the overshoot current and the write current are decreased at the time of the TPTP being saturated, it is possible to effectively improve an ATE property of the hard disk drive.

21 Claims, 7 Drawing Sheets

ROTATIONAL DIRECTION OF HARD DISK

FIG. 3B

ROTATIONAL DIRECTION OF HARD DISK

METHOD AND APPARATUS FOR CONTROLLING A WRITE CURRENT IN A HARD DISK DRIVE

CROSS-REFERENCE TO RELATED APPLICATIONS

This application claims the priority benefit of Korean Patent Application No. 2003-96289, filed on Dec. 24, 2003, in the Korean Intellectual Property Office, the disclosure of which is incorporated herein in its entirety by reference.

BACKGROUND OF THE INVENTION

1. Field of the Invention

The present invention relates to a hard disk drive, and more particularly, to a method and apparatus for controlling a write current in a hard disk drive in order to improve an adjacent track erasure (ATE) property of the hard disk drive.

2. Description of the Related Art

A hard disk drive is an auxiliary storage apparatus of a computer used to read or write data from or to a magnetic layer of a hard disk with a magnetic head.

A writing magnetic head of a conventional hard disk drive is made of a metallic material, typically, a permalloy of 80% Ni and 20% Fe. A head slider for supporting the writing magnetic head is made of a non-metallic material.

Accordingly, when a write current flows though a metallic recording coil of the head, heat is generated. Due to a difference in thermal expansion coefficients between metallic and non-metallic materials, a thermal pole-tip protrusion (TPTP) phenomenon occurs, where parts around poles of the head protrude.

As is well known, the amount of the TPTP is proportional to $I^2R$. Here, I denotes a current in the recording coil, and R denotes a resistance of the recording coil. In order to reduce the TPTP, it is necessary to reduce the current and the resistance R of the recording coil. The resistance R of the recording coil is a factor usually fixed during the production of the head. On the other hand, the current I is based on a write current and an over shoot current. Since the amount of the TPTP is proportional to the square of the current I, the TPTP is more sensitive to the current I than the resistance R.

As hard disk drives have higher densities, a track per inch (TPI) in the hard disk drives also increases. As a result, interference between tracks has been an important factor intensively considered during the design of the hard disk drive.

In other words, it becomes more difficult to stay below an adjacent track erasure (ATE) property threshold, as well as to secure a track margin. The ATE property threshold refers to a maximum allowable amount of adjacent tracks that are erased when a recording operation is performed on a track. A hard disk drive head with at most less than the ATE property threshold can be considered to be in a normal state, i.e., a non-ATE head. Conversely, a hard disk drive head that has an ATE property greater than the ATE property threshold would be considered in an ATE state, i.e., an ATE head. A head in an ATE state can further be considered to be ATE saturated.

SUMMARY OF THE INVENTION

Embodiments of the present invention provide a method and apparatus for controlling a write current to improve an ATE property of a hard disk drive.

Additional aspects and/or advantages of the invention will be set forth in part in the description which follows and, in part, will be obvious from the description, or may be learned by practice of the invention.

To achieve the above and/or additional aspects and advantages, embodiments of the present invention may include a method of controlling a current in a hard disk drive, including applying an overshoot current and a write current to a head of the hard disk drive, to write data on a disk of the hard disk drive, waiting for predetermined time to pass, wherein the predetermined time is determined based on a thermal pole-tip protrusion (TPTP) property of the head, and reducing the overshoot current and the write current when the predetermined time passes.

The predetermined time may be determined by a process including detecting times, from write operation starting points, until corresponding adjacent track erasure (ATE) saturations, and calculating an average of the detected times.

The method may further include measuring an adjacent track erasure (ATE) property of the head, and determining an amount of the overshoot current and the write current to be reduced based on the measured ATE property of the head. The measuring of the ATE property may also include repetitively writing data on two tracks adjacent to a test target track, reading data written on the test target track and counting a number of detected errors in the read data, and determining the amount of the overshoot current and the write current to be reduced based on the number of detected errors.

To achieve the above and/or additional aspects and advantages, embodiments of the present invention may further include a method of controlling a current in a hard disk drive, the method including applying an overshoot current and a write current to a head of the hard disk drive, to write data on a disk of the hard disk drive, and changing the overshoot current and the write current when an adjacent track erasure (ATE) property of the head exceeds a threshold.

The changing of the overshoot current can be performed in predetermined steps. Further, the predetermined steps may be equal-distant, the changing of the overshoot current can be performed in singular steps, and the predetermined steps may depend on an assigned profile, of a plurality of profiles, for the head.

In addition, the changing of the overshoot current may occur after a predetermined period of time, with that predetermined period of time being the time between a writing start point and the ATE property of the head exceeding a threshold.

Similarly, the changing of the overshoot current may occur after a predetermined period of time, with that predetermined period of time being the time between a writing start point and a thermal pole-tip protrusion (TPTP) of the head saturating. The predetermined period of time may also be recorded during manufacturing of the hard disk drive.

Further, the applying the overshoot current and the write current to the head of the hard disk drive may further include performing a data writing operation to a to-be-tested track, performing a data writing operation on tracks adjacent to the to-be-tested track, reading data from the to-be-tested track, detecting a number of errors read from the to-be-tested track, and comparing the detected number of errors to an error threshold value to determine the ATE property of the head. The performing of data writing operation to the to-be-tested track may also include reading data from the to-be-tested track to assign optimal overshoot and write currents to satisfy a predetermined bit error rate.

In addition, a predetermined step for the overshoot current may be independent from a predetermined step for the write current. Further, parameters corresponding to the predetermined steps of the overshoot current and the write current can be stored on the disk during manufacture of the hard disk drive.

Lastly, to achieve the above and/or additional aspects and advantages, embodiments of the present invention may further include a hard disk drive, including a disk for storing information, a head assembly comprising a head to control the addition and/or deletion of information to/from the disk, and an actuator assembly to rotate the head assembly, wherein an overshoot current and a write current applied to the head are applied according to any of the methods of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Embodiments of the present invention include a method and apparatus for suppressing an overshoot current and a write current to improve an adjacent track erasure (ATE) property of a hard disk drive. More particularly, according to embodiments of the present invention, an ATE property of a hard disk drive can be improved by reducing the overshoot current and the write current based on an ATE property of a head of the hard disk drive after a predetermined time has passed since a start of a write operation.

The ATE status of the head is observed to remarkably occur at the same time as when a thermal pole tip protrusion (TPTP) is saturated. Therefore, it is necessary to improve the ATE property of the hard disk drive by reducing the overshoot current and the write current when the TPTP is saturated.

The hard disk drive includes at least one head for reading or writing data from or to a rotating disk. More specifically, the head reads data from the disk by sensing a magnetic field of a magnetic layer of the disk. The head writes data to the disk by magnetizing the magnetic layer of the disk.

Figure 1:
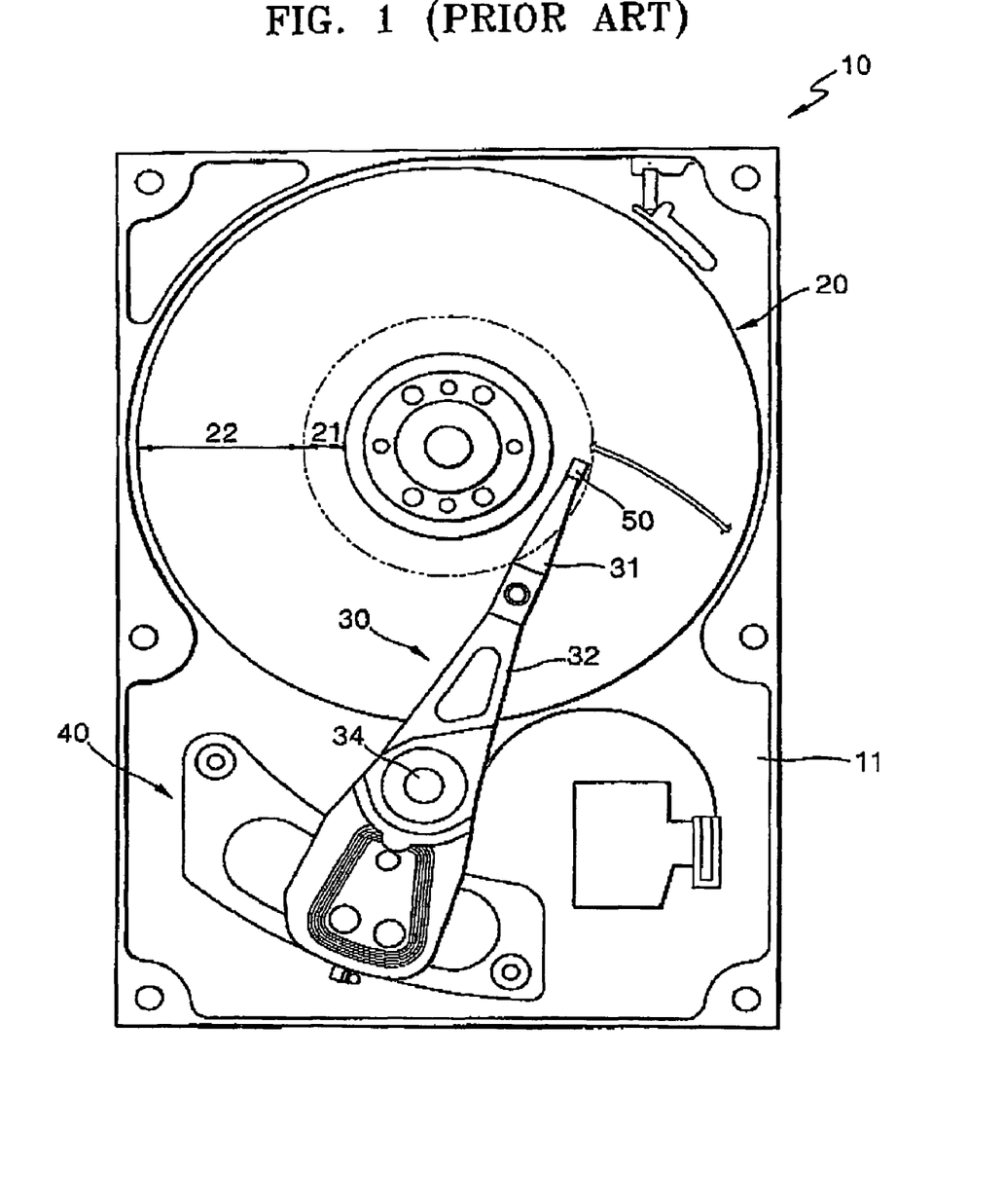
FIG. 1 is a perspective view illustrating a hard disk drive.

FIG. 1 is a prospective view showing a hard disk drive 10. The hard disk drive 10 includes a base 11, a hard disk 20 rotating on the base 11, a head assembly 30, and an actuator driving member 40, which rotates the head assembly 30 with an electromagnetic force. The head assembly 30 includes: an actuator arm 32, connected to be rotatable, to a rotary shaft 34 provided on the base 11; suspension 31 connected to an end of the actuator arm 32; and a head slider 50 connected to the suspension 31. Here, the hard disk 20 is divided into a data region 22, where information is recoded, and a parking region 21, where the head slider 50 is parked when the hard disk drive is stopped. The head slider 50 includes a head 70 for reading or writing data from or to the hard disk 20.

The head slider 50 is biased toward the hard disk 20 by the suspension 31. As the hard disk 20 rotates, the head slider 50 rises and flies on the hard disk 20 by an air-floating pressure generated by the rotation of the hard disk 20. The flying height (FH) of the head slider 50 is determined according to both a load of the suspension 31 and a lifting force generated by the air-flow, generated by the rotation of the hard disk 20.

More specifically, the FH of the head slider 50 is the distance between a magnetic resistance (MR) head, of the head slider 50, and the disk surface when the head slider 50 flies on the hard disk 20.

Figure 2:
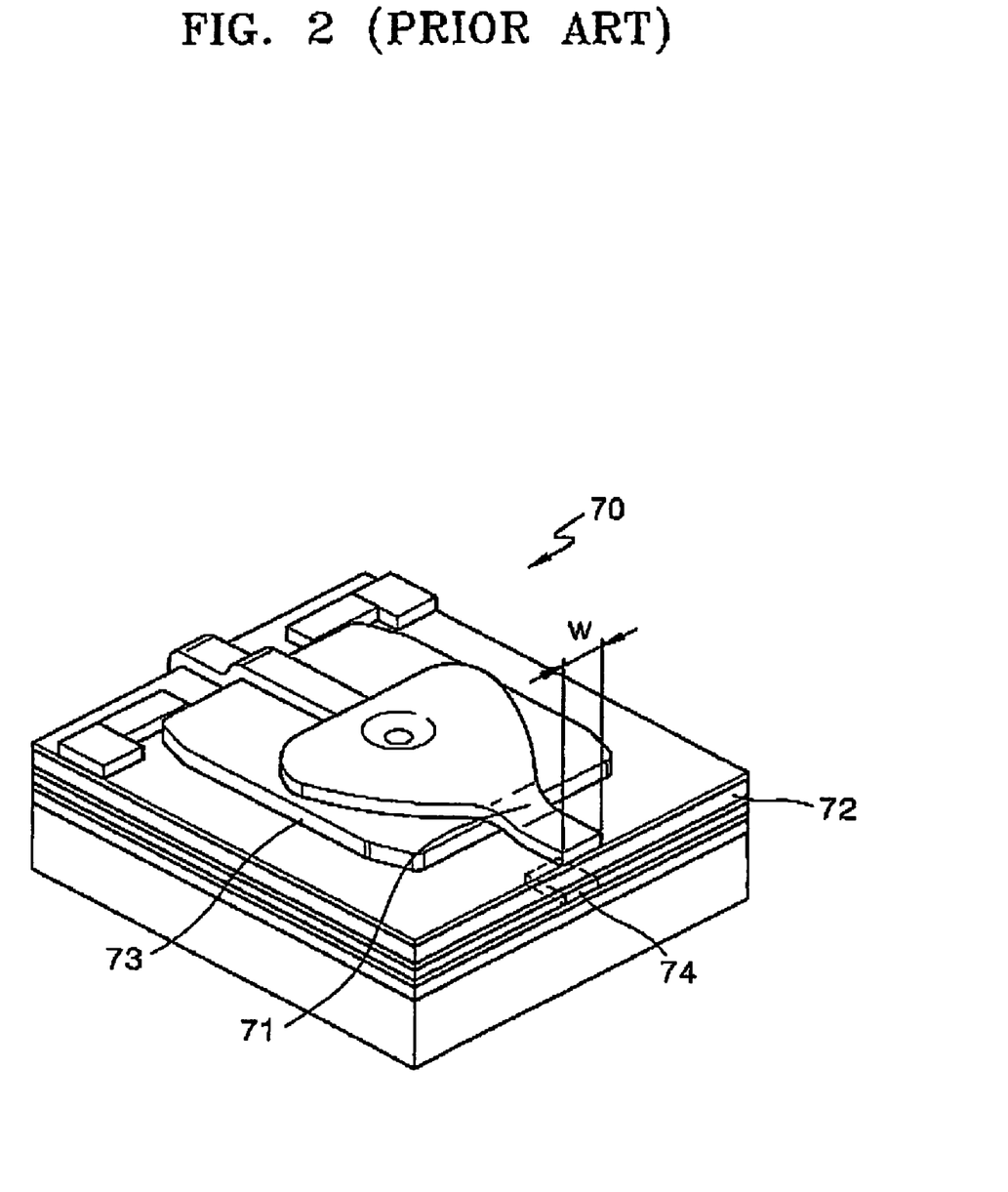
FIG. 2 is an exploded perspective view illustrating a head of a hard disk drive.

FIG. 2 is an exploded perspective view of a magnetic head 70 of the hard disk drive 10. As shown in FIG. 2, the magnetic head 70 includes an MR head 74 for reading data from the hard disk 20 and an inductive recording head for writing data to the hard disk 20. More specially, the MR head 74 senses a recorded magnetic signal on the hard disk 20. On the other hand, the inductive recording head, which writes data to the hard disk 20, includes a top pole 71, a bottom pole 72, and a recording coil 73 for generating a magnetic field in accordance with a current. The top and bottom poles 71 and 72 are separated from each other by a predetermined gap in order to generate leakage magnetic flux used to magnetize the magnetic layer of the hard disk 20.

Recently, the track per inch (TPI) of the hard disk 20 has been increased and the track width has been decreased in order to increase the capacity of a hard disk drive.

In order to decrease the track width of the hard disk 20, it is necessary to decrease the width of the inductive recording head and to lower the FH of the head 70.

As the FH of the head 70 is lowered, the distance between the head 70 and the hard disk 20 becomes too short to maintain the head 70 in a non-ATE state. In particular, serious failures could occur due to the head 70 being in the ATE state.

Figure 3A:
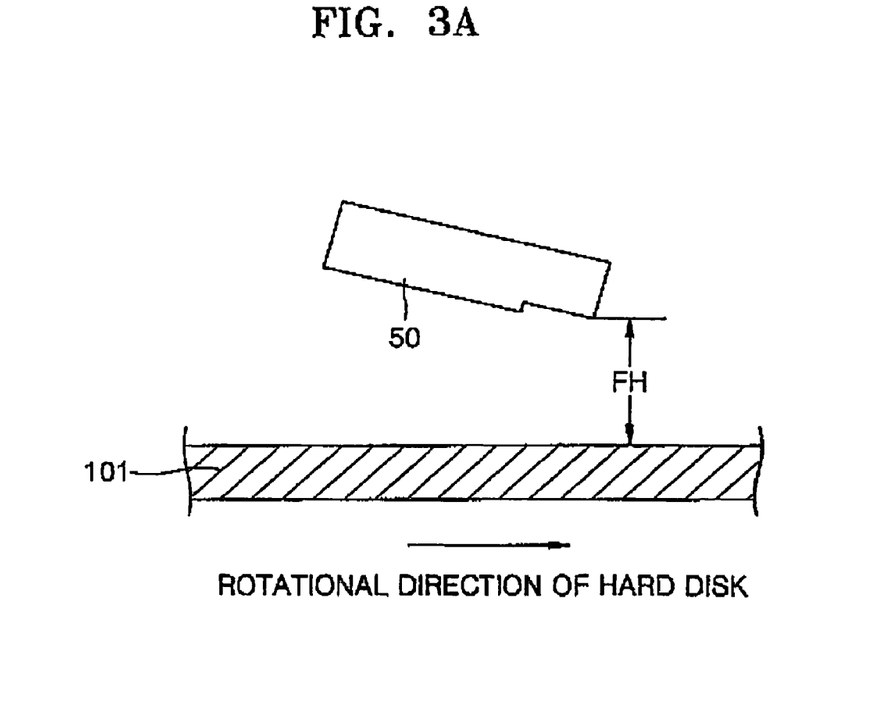
FIGS. 3A and 3B are schematic views, respectively, illustrating the TPTP influences on a head.
Figure 3B:
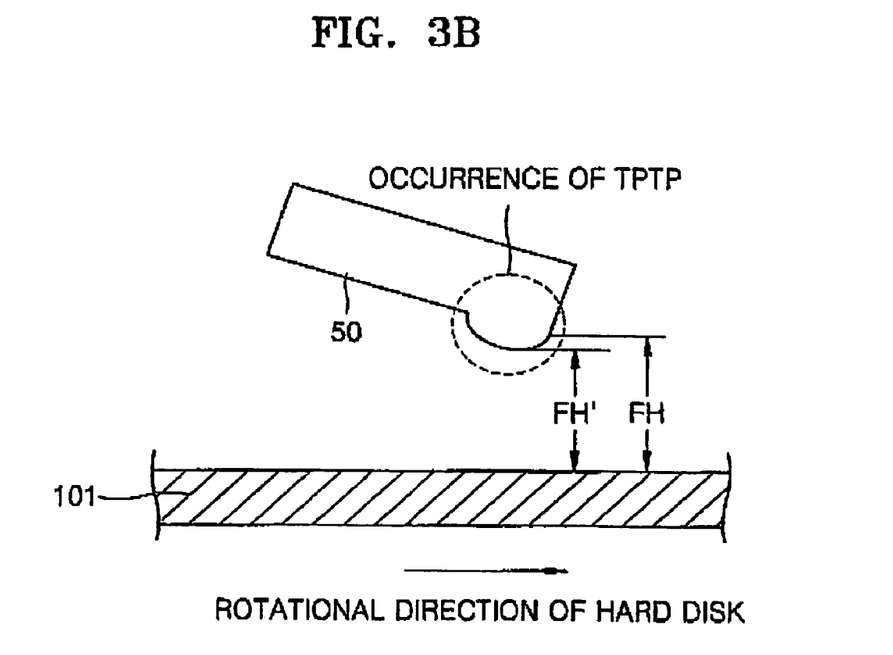

FIGS. 3A and 3B schematically illustrate influences of the TPTP. FIG. 3A illustrates a reading operation, and FIG. 3B illustrates a writing operation. As illustrated in FIG. 3B, the recording pole is protruded, differently from the reading pole in FIG. 3A. The protrusion of the recording pole occurs because of differences in thermal expansion coefficients between the head slider 50 and the head 70.

Figure 4:
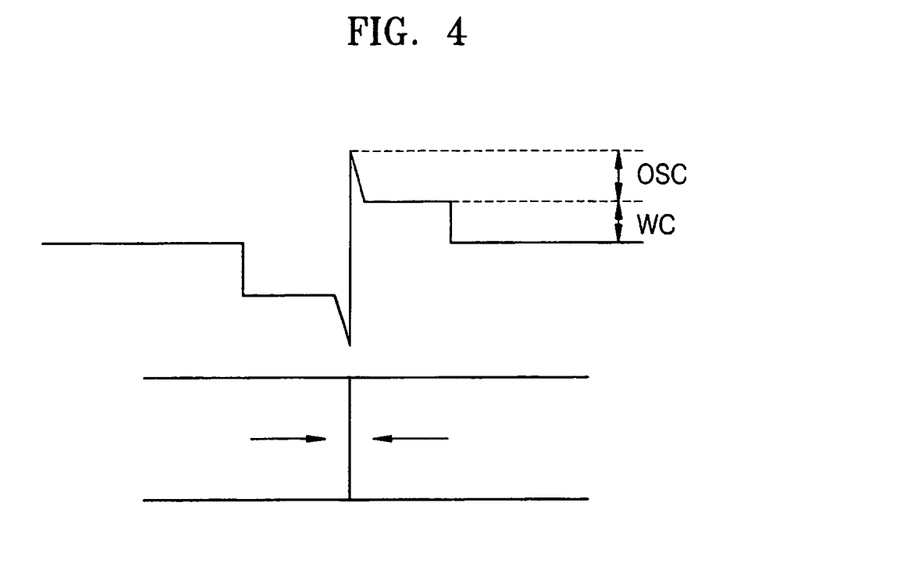
FIG. 4 illustrates a waveform of a write current.

FIG. 4 illustrates a waveform of a write current. It can be understood that overshoot components are introduced before and after the point where data recorded on the hard disk is converted. The overshoot current refers to a current for providing the overshoot components, as shown in FIG. 4.

The write current maintains the magnitude of the magnetic field near a level of a coercive force. The overshoot current increases the magnitude of the magnetic field, over a level of the coercive force, to the point where a direction of the underlying magnetic field changes.

Therefore, the amount of the TPTP in the write operation is influenced by the write current and the overshoot current.

Figure 5:
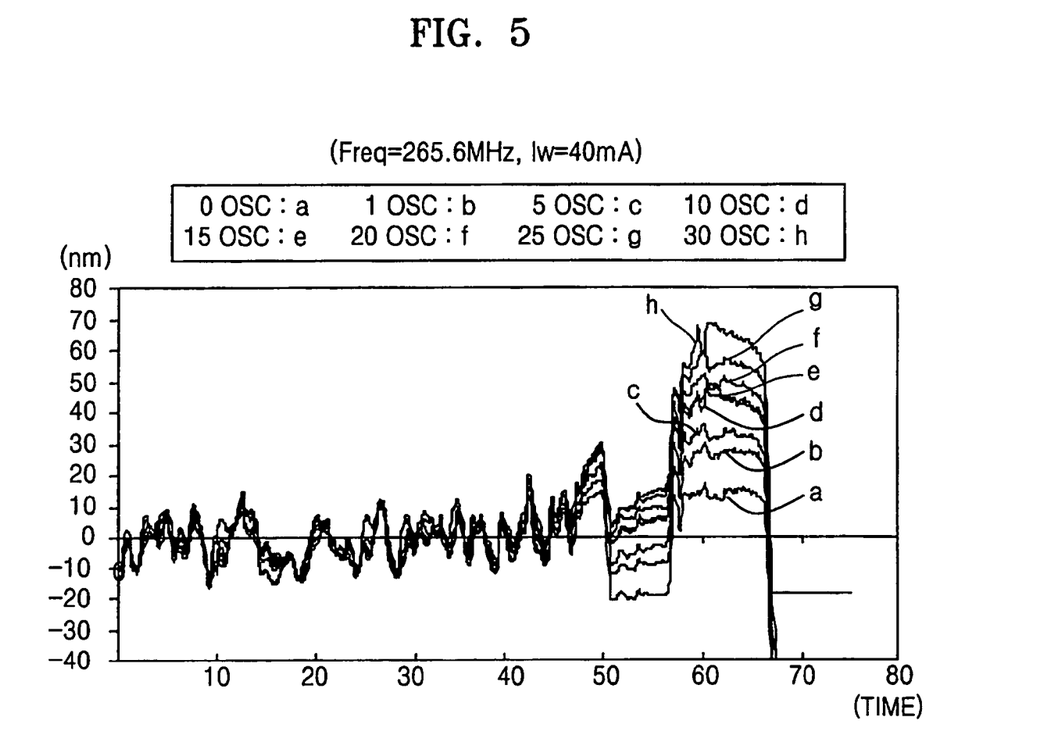
FIG. 5 graphically illustrates a TPTP profile measured as an overshoot current (OSC) varies.

FIG. 5 graphically illustrates profiles of the TPTP measured as the overshoot current varies. The vertical and horizontal axes represent a magnitude of the TPTP and time, respectively. In FIG. 5, the magnitude of the TPTP is depicted in nanometers according to the overshoot current value 0(*a*), 1(*b*), 5(*c*), 10(*d*), 15(*e*), 20(*f*), 25(*g*), and 30(*h*). Here, the numbers 0, 1, 5, 10, 20, 25, and 30 represent potential step-values for controlling the overshoot current OSC. Lettering a, b, c, d, e, f, g, and h represent potential profiles. In an example, the overshoot current may be controlled with one of 32 steps, in a range between minimum and maximum values. For example, graphed profile b illustrates a variation of the TPTP over time when the overshoot current is set to Step 1, where the overshoot current has a value increased by one step from its minimum value.

Referring to FIG. 5, it should be understood that the amount of the TPTP increases with an increase in the overshoot current. For example, the TPTP could be increased by 10 Å with an increase of the overshoot current by 4 steps. Since the typical flight height FH is 100 Å, the flight height FH can be varied by 10%, with a variation of the overshoot current by 4 steps. Therefore, it should be understood that the TPTP may seriously affect the performance of the hard disk drive.

Figure 6:
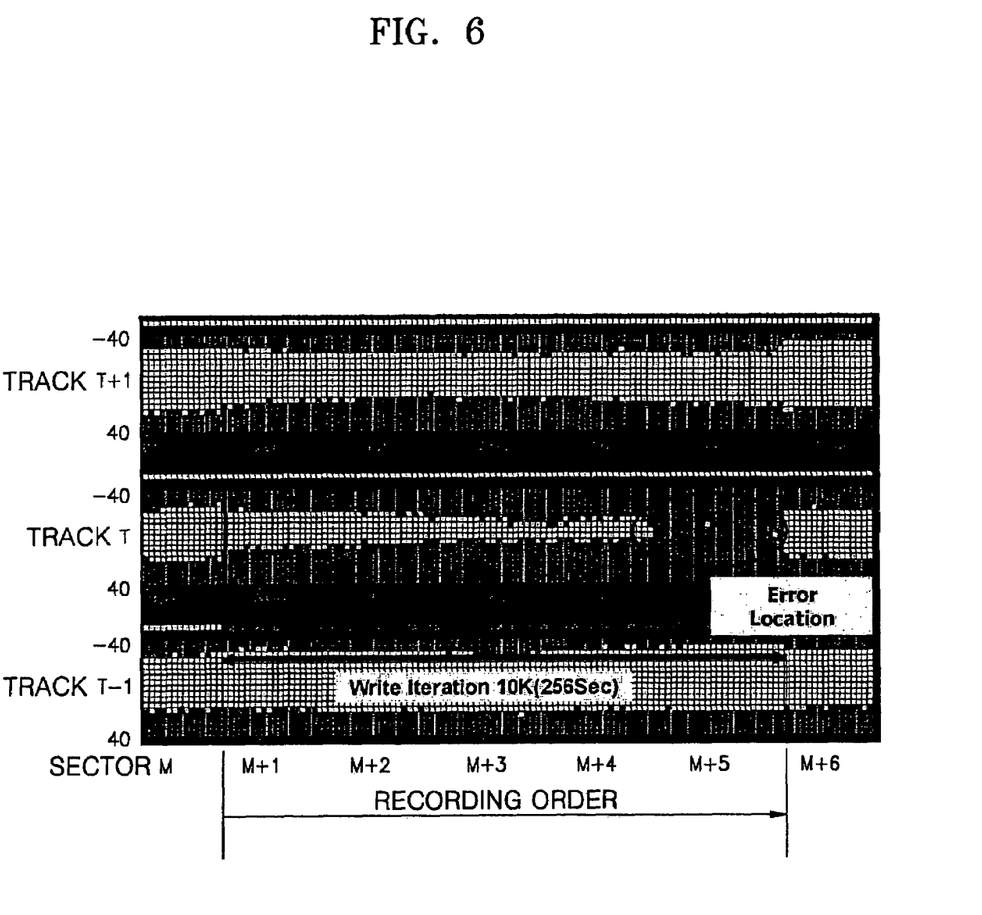
FIG. 6 graphically illustrates written-states of a head, including the head being in an ATE state.

FIG. 6 graphically illustrates written-states in a head, including the head being in an ATE state. The vertical and horizontal axes represent track numbers and sector numbers, respectively. In FIG. 6, track numbers 51633, 51634, and 51635 are depicted. The central track number 51634 is the to-be-tested track. The track numbers 51633 and 51635 are adjacent tracks, that is, tracks adjacent to the to-be-tested track.

Assuming that a writing operation is performed, from the left side to the right side in FIG. 6, the horizontal axis represents time passed.

A region having no errors is represented with white dots, a region readable after several retry operations is represented with gray dots, and a region having erased data, under the influence of the ATE, is represented with black dots.

As illustrated in FIG. 6, the black dots increase gradually toward the right side. Thus, it can be understood that errors increase because the ATE property of the head increased in the right region. When the writing operation is performed with the head in an ATE state, as time passes, more tracks will become erased. Finally, at the end of the write operation, almost all the tracks may have been erased.

In order to reduce the ATE influence on the hard disk drive, it is necessary to reduce the overshoot current and the write current after the TPTP is saturated.

Figure 7:
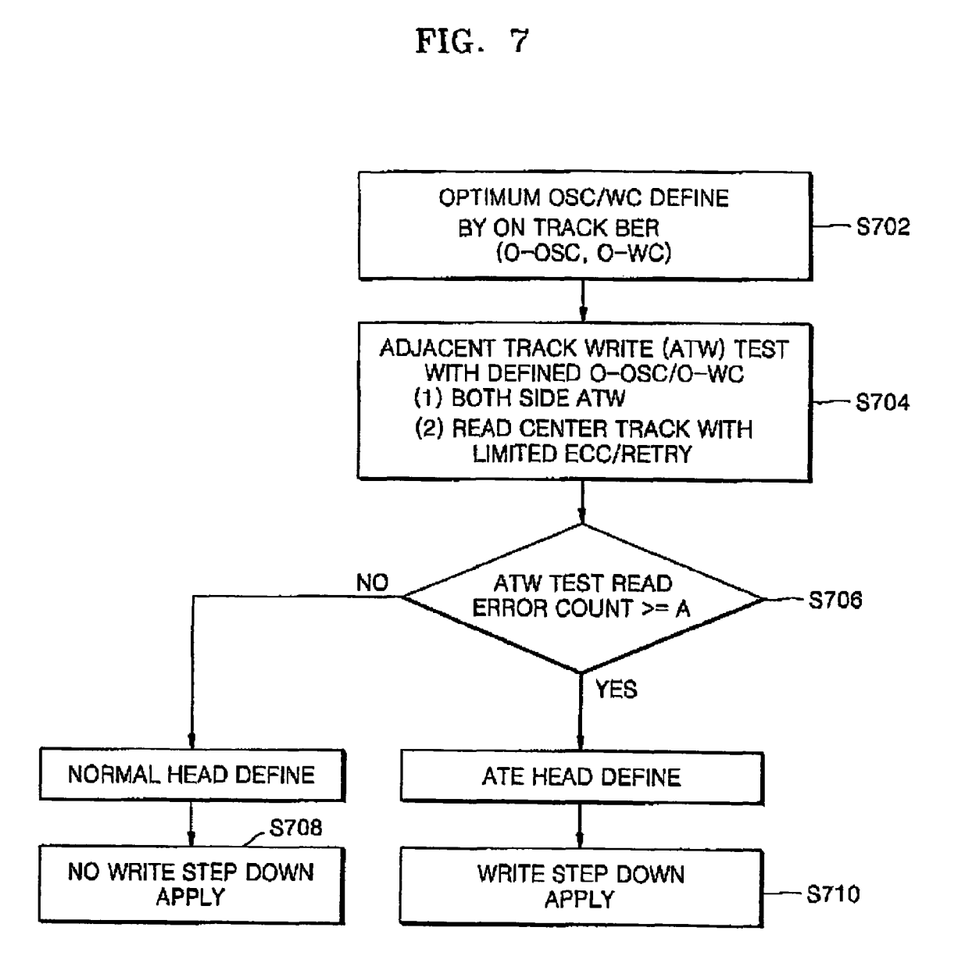
FIG. 7 is a flowchart identifying a method of controlling a write current, according to an embodiment of the present invention.

FIG. 7 is a flowchart identifying a method for controlling the write current, according to an embodiment of the present invention.

Firstly, in operation S702, the overshoot current and the write current are determined to be optimal values.

More specifically, a data writing operation is performed on the to-be-tested track. Next, data is read from the to-be-tested track. The optimal overshoot current o-OSC and write current o-WC can then be determined to satisfy a predetermined bit error rate (BER).

Adjacent track writing (ATW) operations are then performed, in operation S704, by using the optimal overshoot current o-OSC and the optimal write current o-WC, determined in operation S702.

More specifically, data writing operations are repetitively performed on 'adjacent tracks', that is, tracks adjacent to the to-be-tested track. Next, in operation S706, data is read from the to-be-tested track, and a number of errors detected are counted. At this time, a retry number and an error correction code (ECC) limit are set to be less than their typical values, that is, lower than their typical values for normal reproducing.

The error number is then compared with a predetermined threshold value A. The error number corresponds to a degree of the ATE property of the head. The threshold value A is used to determine whether or not the head is in an ATE state, i.e., whether the head has too high of a propensity for ATE.

If the error number is equal to or larger than the threshold value A, the head is determined to be in an ATE state, and if not, the head is determined to be in a normal state and the overshoot current and write current are not modified, in operation S708.

If the head is in an ATE state, the overshoot current and the write current are modified during the write operation, in operation S710.

Figure 8:
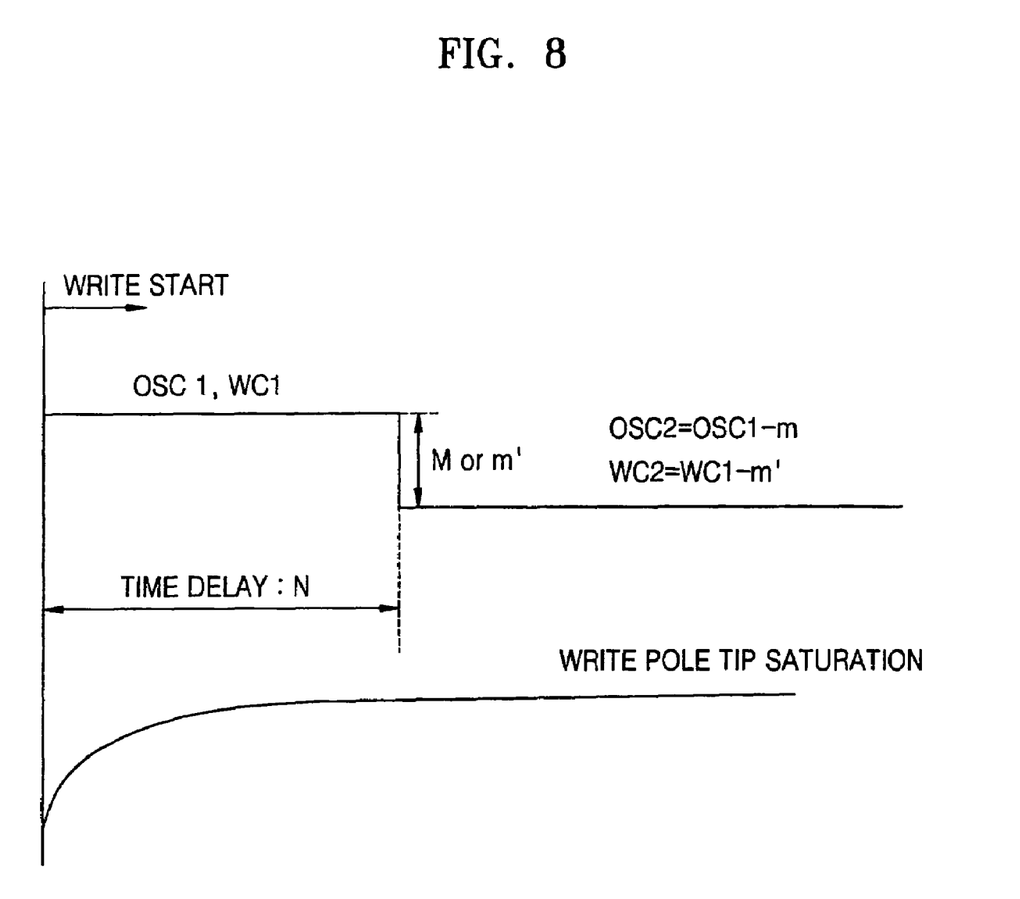
FIG. 8 graphically explains an operation of a hard disk drive apparatus and method for controlling a write current, according to an embodiment of present invention.

FIG. 8 graphically explains an operation of a hard disk drive apparatus and method, according to an embodiment of the present invention.

At the beginning of the write operation, a first write current WC1 and a first overshoot current OSC1 are applied. The first write current WC1 and the first overshoot current OSC1 are set to their optimal values, in accordance with the operating environment of the hard disk drive.

When the time N passes, that is, at the time of the TPTP being saturated, a second write current WC2 and a second overshoot current OSC2 are applied. Here, the following relations are satisfied.

$$WC2 = WC1 - m$$

$$OSC2 = OSC1 - m'$$

Here, each head may have different passing times N, corresponding to the time from a start of a write operation until the corresponding TPTP is saturated. More specifically, each of the passing times N is dependent on the coil turns and inductance value of each recording head, and characteristics of a pre-amplifier. The passing time N of each head is measured during the manufacturing of the hard disk drive and stored in a maintenance cylinder, in order to be provided later in the user environment.

For example, the passing time N can be determined by detecting ATE status of a plurality of the heads of the hard disk drive and averaging the different times during each head changes from the normal to an ATE state statistically. Alternatively, the passing time N can be determined by detecting the time during each head changes from the normal to an ATE status.

Since each of heads have different ATE properties, the parameters m and m', of the above relationships, for each head, need to be set differently.

In a normal status head, the overshoot current OSC and the write current WC applied at the beginning of a general write operation can be maintained as time progresses.

In the case of such a normal status head, even though the TPTP is saturated, the ATE may not occur that much.

Therefore, in the case of the normal status head, there is no need to reduce the overshoot current OSC and the write current WC.

However, the amounts of the overshoot OSC and the write current WC may be adjusted in consideration of the error number A. The parameters used to control the write current WC can be recorded in the maintenance cylinder, and provided for a user's reference.

According to a method of controlling a write current of the present invention, it is possible to improve an ATE property of a hard disk drive by reducing an overshoot current and a write current when the TPTP is saturated during a write operation.

In addition, according to a method of controlling a write current of the present invention, it is possible to improve performance of a hard disk drive by setting a write current control parameter, based on an ATE property of a head of the hard disk drive.

In addition, according to a method of controlling a write current of the present invention, it is possible to increase the life time and reliability of a hard disk drive.

It is also apparent that embodiments of the present invention can be adapted to various data storage apparatuses as well as various disk drives, such as the hard disk drive illustrated in FIG. 1.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling a current in a hard disk drive, the method comprising:
    applying an overshoot current and a write current to a head of the hard disk drive, to write data on a disk of the hard disk drive;
    waiting for predetermined time to pass, wherein the predetermined time is determined based on a thermal pole-tip protrusion (TPTP) property of the head; and
    reducing the overshoot current and the write current when the predetermined time passes.

2. The method according to claim 1, wherein the reduced amount of the overshoot current and the write current are dependent on an adjacent track erasure (ATE) property of the head.

3. The method according to claim 1, wherein the predetermined time corresponds to a time from a start of a write operation until a TPTP of the head becomes saturated, and the hard disk drive comprises a plurality of heads.

4. The method according to claim 3, wherein the predetermined time is determined by a process comprising:
    detecting times, from write operation starting points, until corresponding adjacent track erasure (ATE) saturations; and
    calculating an average of the detected times.

5. The method according to claim 3, wherein the predetermined time for each head is determined by detecting a time from write operation starting times until corresponding adjacent track erasure (ATE) saturations.

6. The method according to claim 1, further comprising:
    measuring an adjacent track erasure (ATE) property of the head; and
    determining an amount of the overshoot current and the write current to be reduced based on the measured ATE property of the head.

7. The method according to claim 6, wherein the measuring of the ATE property comprises:
    repetitively writing data on two tracks adjacent to a test target track;
    reading data written on the test target track and counting a number of detected errors in the read data; and
    determining the amount of the overshoot current and the write current to be reduced based on the number of detected errors.

8. A method of controlling a current in a hard disk drive, the method comprising:
    applying an overshoot current and a write current to a head of the hard disk drive, to write data on a disk of the hard disk drive; and
    changing the overshoot current and the write current when an adjacent track erasure (ATE) property of the head exceeds a threshold.
    wherein the ATE property of the head corresponds to a saturation of a thermal pole-tip protrusion (TPTP) of the head.

9. The method of claim 8, wherein the changing of the overshoot current is performed in predetermined steps.

10. The method of claim 9, wherein the predetermined steps are equidistant.

11. The method of claim 9, wherein the changing of the overshoot current is performed in singular steps.

12. A method of controlling a current in a hard disk drive, the method comprising:
    applying an overshoot current and a write current to a head of the hard disk drive, to write data on a disk of the hard disk drive; and
    changing the overshoot current and the write current when an adjacent track erasure (ATE) property of the head exceeds a threshold,
    wherein the changing of the overshoot current is performed in predetermined steps, and
    wherein the predetermined steps depend on an assigned profile, of a plurality of profiles, for the head.

13. A method of controlling a current in a hard disk drive, the method comprising:
    applying an overshoot current and a write current to a head of the hard disk drive, to write data on a disk of the hard disk drive; and
    changing the overshoot current and the write current when an adjacent track erasure (ATE) property of the head exceeds a threshold,
    wherein the changing of the overshoot current occurs after a predetermined period of time, with that predetermined period of time being the time between a writing start point and the ATE property of the head exceeding a threshold.

14. A method of controlling a current in a hard disk drive, the method comprising:
    applying an overshoot current and a write current to a head of the hard disk drive, to write data on a disk of the hard disk drive; and
    changing the overshoot current and the write current when an adjacent track erasure (ATE) property of the head exceeds a threshold,
    wherein the changing of the overshoot current occurs after a predetermined period of time, with that predetermined period of time being the time between a writing start point and a thermal pole-tip protrusion (TPTP) of the head saturating.

15. The method of claim 14, wherein the predetermined period of time is recorded during manufacturing of the hard disk drive.

16. The method of claim 8, wherein the applying the overshoot current and the write current to the head of the hard disk drive further comprises:

performing a data writing operation to a to-be-tested track;

performing a data writing operation on tracks adjacent to the to-be-tested track;

reading data from the to-be-tested track, detecting a number of errors read from the to-be-tested track, and comparing the detected number of errors to an error threshold value to determine the ATE property of the head.

17. A method of controlling a current in a hard disk drive, the method comprising:

applying an overshoot current and a write current to a head of the hard disk drive, to write data on a disk of the hard disk drive; and changing the overshoot current and the write current when an adjacent track erasure (ATE) property of the head exceeds a threshold, wherein the applying the overshoot current and the write current to the head of the hard disk drive further comprises:

performing a data writing operation to a to-be-tested track;

performing a data writing operation on tracks adjacent to the to-be-tested track; reading data from the to-be-tested track, detecting a number of errors read from the to-be-tested track, and comparing the detected number of errors to an error threshold value to determine the ATE property of the head, and wherein the performing of data writing operation to the to-be-tested track includes reading data from the to-be-tested track to assign optimal overshoot and write currents to satisfy a predetermined bit error rate.

18. The method of claim 9, wherein a predetermined step for the overshoot current is independent from a predetermined step for the write current.

19. The method of claim 18, wherein parameters corresponding to the predetermined steps of the overshoot current and the write current are stored on the disk during manufacture of the hard disk drive.

20. A hard disk drive, comprising:

a disk for storing information;

a head assembly comprising a head to control the addition and/or deletion of information to/from the disk; and an actuator assembly to rotate the head assembly, wherein an overshoot and write current applied to the head are applied according to the method of claim 1.

21. A hard disk drive, comprising:

a disk for storing information;

a head assembly comprising a head to control the addition and/or deletion of information to/from the disk; and an actuator assembly to rotate the head assembly, wherein an overshoot and write current applied to the head are applied according to the method of claim 8.

* * * * *

UNITED STATES PATENT AND TRADEMARK OFFICE
CERTIFICATE OF CORRECTION

PATENT NO.        : 7,095,576 B2                                           Page 1 of 1
APPLICATION NO. : 10/943161
DATED             : August 22, 2006
INVENTOR(S)       : Jong-yoon Kim et al.

It is certified that error appears in the above-identified patent and that said Letters Patent is hereby corrected as shown below:

Col. 8, line 17, change "threshold." to --threshold,--

Col. 8, line 24, change "equidistant" to --equi-distant--

Col. 8, line 38, change "forthe" to --for the--

Col. 9, line 26, change "adiacent" to --adjacent--

Signed and Sealed this

Twentieth Day of March, 2007

JON W. DUDAS
*Director of the United States Patent and Trademark Office*